Feb. 5, 1946. T. F. BLUDWORTH 2,394,287
INTERVAL METER AND INDICATOR THEREFOR
Filed Aug. 21, 1941 3 Sheets-Sheet 2
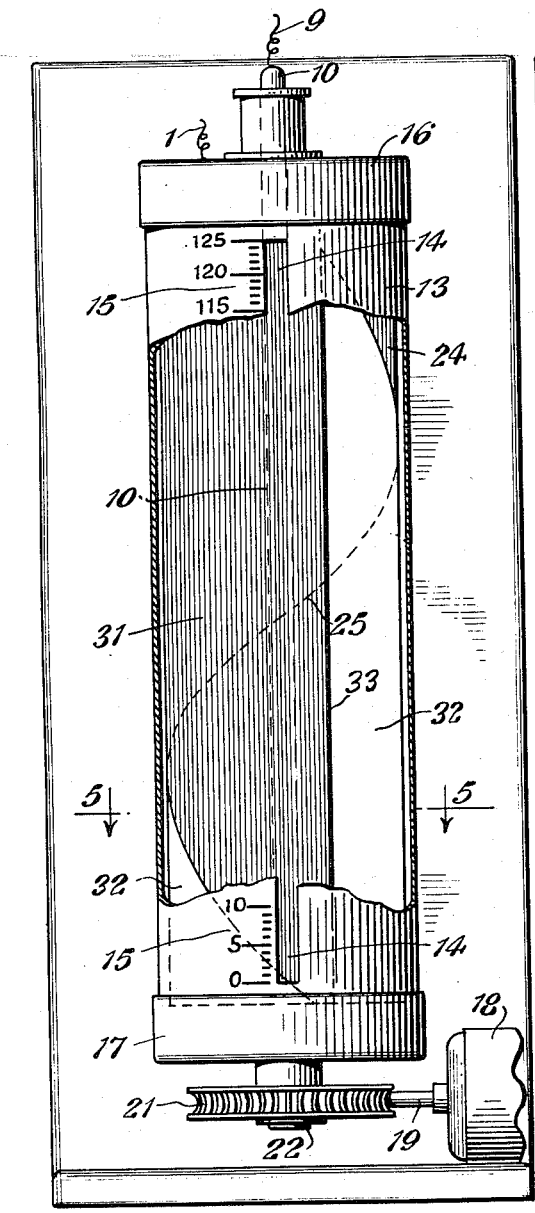
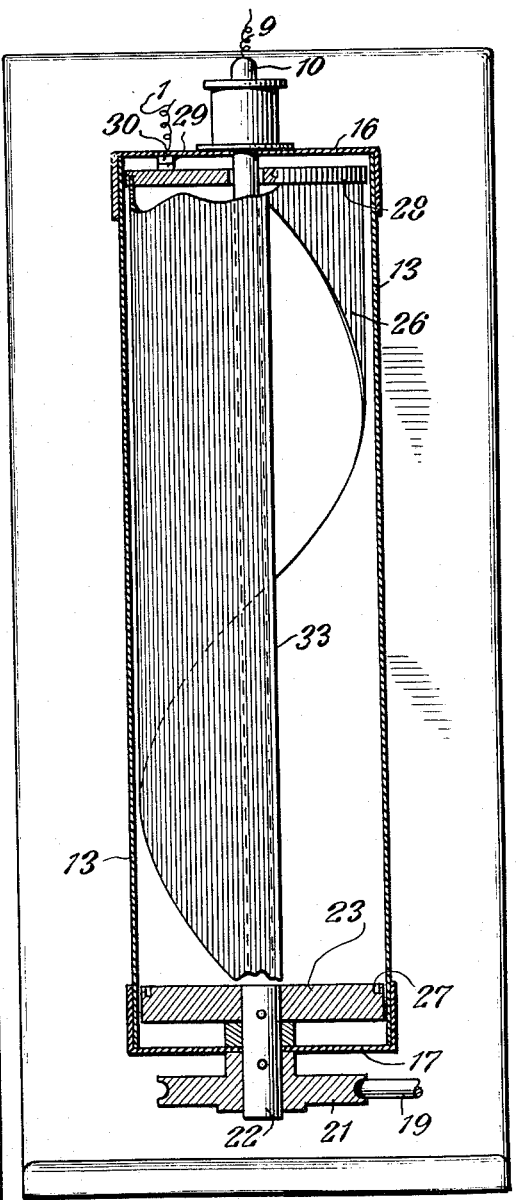
INVENTOR
Timothy Frank Bludworth
BY
Hastings W. Baker
ATTORNEY Feb. 5, 1946. T. F. BLUDWORTH 2,394,287
INTERVAL METER AND INDICATOR THEREFOR
Filed Aug. 21, 1941 3 Sheets-Sheet 3

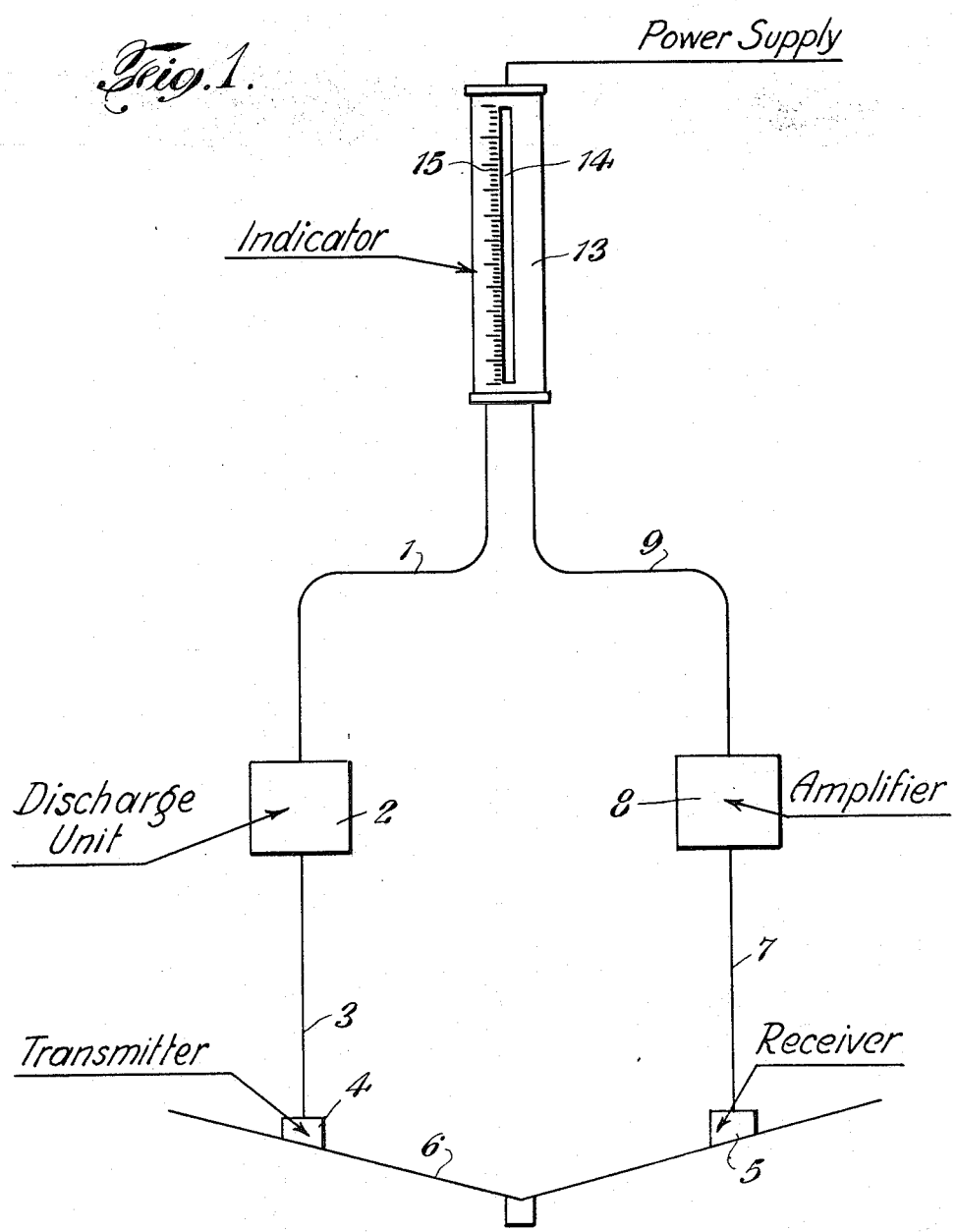

INVENTOR
Timothy Frank Bludworth
BY Hastings W. Baker.
ATTORNEY

Patented Feb. 5, 1946

2,394,287

UNITED STATES PATENT OFFICE 2,394,287

INTERVAL METER AND INDICATOR THEREFOR

Timothy Frank Bludworth, Summit, N. J., assignor to National-Simplex-Bludworth, Inc., a corporation of Delaware Application August 21, 1941, Serial No. 407,778

3 Claims. (Cl. 161—15)

This invention relates to an interval meter and an indicator therefor. Such a meter has many uses, and, in fact, could be used in almost any apparatus to determine data in which a time interval is a factor. For instance, it is well known that on the propeller shaft of a steamship there is a twist of the shaft dependent upon the torsion, so that the rear portion of the propeller shaft would lag behind the part thereof nearer the engines. Obviously, if we select two points on this shaft which would be in alignment when there is no torsion, the point nearer the engines would pass a fixed point at an earlier period of time when the shaft was under torsional stresses than would the point nearer the propeller, and this difference or time interval could be used to measure the amount of torsion of the said shaft.

Another use, which is shown by way of illustration herein, is as a depth meter. In such a use, an impulse is sent from the transmitter creating sonic or supersonic waves which travel to the bottom of the ocean or other reflecting surface and are reflected back to a receiver. The interval of time during which the impulse was traveling through the water is a function of the depth when the rate of travel through the water is known. If a helical shutter is employed in connection with a scale having a window therein, and if the shutter commences to operate so as to expose the lowermost position of the window at the instant the transmitter sends out its signal, and if the shutter, during its continuous rotation beyond its zero point, exposes more and more of the window, and if a light is caused to be controlled by the received echo, it is possible, knowing the velocity of sound in the medium through which it is passing, to provide an indicator which will indicate the depth.

In mentioning that the light is controlled by the received echo, the light could shine during the entire interval between the sending of the signal and the receipt of its echo and go out upon the receipt of the echo, or the lamp could be in darkness during the said interval and shine momentarily only at the instant of the receipt of the echo. The circuits to light the lamp during the entire interval, or to cause it to be illuminated only momentarily at the end of the interval, are old and well known in the art and need not be described herein.

When a helical shutter is employed behind a rectilinear window, there would be a rising column of light in the case where the lamp was illuminated during the entire period of the interval. In case the lamp was caused to be illuminated only instantaneously at the end of the echo, the observer would not see a rising column of light, but would notice an instantaneous column of light indicating the depth at the moment of the receipt of the echo.

Depth finding is, of course, only one of the many applications of this apparatus. Obviously, the impulse need not be sent through water. It might be sent through air, steel, or any other medium, but, of course, the calibrations of the indicator should accordingly be changed. Furthermore, the sound or impulse might be used in distance finding, other than vertically, such as to determine the distance to another vessel, submarine, iceberg, or the shore, or any reflecting surface.

In any form of distance measuring based on the transmission of the sound impulse, the product of the time interval of the travel and the rate of travel per second through the medium is a function of the total distance or depth and vice versa, the total distance or the depth would be a function of the time interval, and in the case of a constantly rotating shutter starting at a zero point, would be a function of the amount of rotation of the shutter from its zero point.

The invention may be better understood by referring to the attached drawings which show the invention by way of illustration and not by way of limitation.

Referring now to the drawings:

Figure 1 is a vertical front view of my invention as applied to a depth finder.

Figure 2 is a vertical front view, partly in cross section, of the indicator and the driving mechanism therefor, said view showing a cylinder of the type shown in Figure 6.

Figure 3 is a vertical cross-sectional view showing a modification consisting of a shutter having a helical contour.

Figure 4:
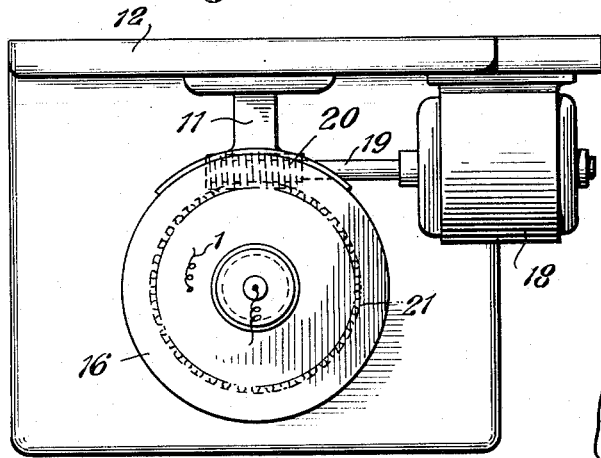
Figure 4 is a top plan view of Figure 2.
Figure 5:
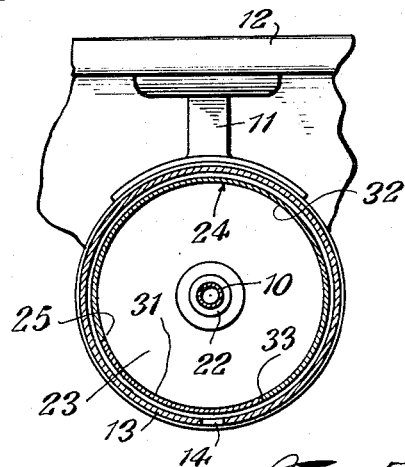
Figure 5 is a cross-sectional view taken on the line 5—5 of Figure 2, but omitting the motor.
Figure 6:
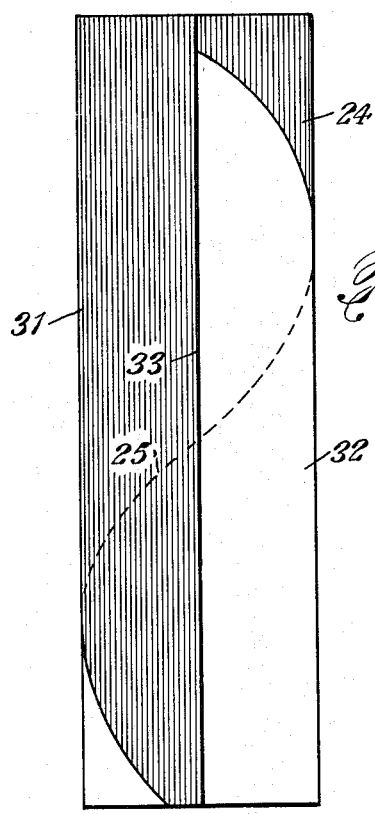
Figure 6 is an elevational view of the shutter shown in Figure 2.

Referring in detail to the drawings, the sending circuit includes the lead 1 extending to the discharge unit 2 which is connected by lead 3 to the transmitter 4, which may be any one of the well known sonic or supersonic types of transmitters which transmits the signal, which travels to the bottom of the ocean and is reflected back and is received by receiver 5, the transmitter and receiver being mounted in the bottom of ship 6. A lead 7 extends from the receiver 5 to an amplifier 8 which is connected by a lead 9 to a neon tube or to any other suitable form of lamp 10. As before stated, the lamp 10 may be illuminated during the entire period or interval during which the sound is traveling in the transmitting medium and back to the receiver, or it may be illuminated only at the instant of the echo.

A bracket 11 may be supported by the support 12. The bracket 11 carries the stationary indicator 13 provided with a vertically extending rectilinear window 14, and adjacent the window is indicia 15 such as fathoms or feet. The stationary indicator 13 is closed at its top by a cap 16 and at its bottom by a cap 17. As shown in Figure 2, the indicia 15 consists of numbers such as from 0 to 125, or any other indicia which may be found desirable. The zero position is indicated as being at or near the bottom of the window, and the highest number is at or near the top of the window. In using the expressions "top" and "bottom," however, it should be understood that this simply means the two ends of the window, irrespective of whether the indicator extends vertically or transversely.

Figure 7:
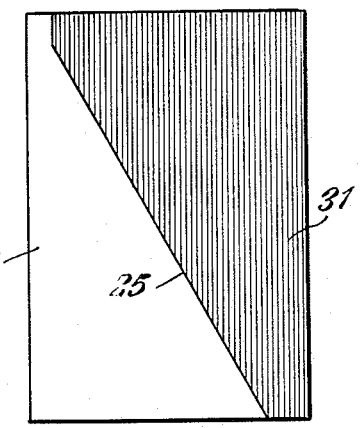
Figure 7 is a plan view of the cylinder shown in Figure 6, if the said cylinder were cut vertically and unrolled into a flat sheet.

A constant speed motor 18 drives a shaft 19 which carries a worm 20 which meshes with and drives a worm gear 21, secured to a shaft 22, which passes through the lower cap 17 of the stationary indicator and is secured to a disc 23 within the stationary indicator. As shown in Figure 2, the rotating cylinder 24 is provided with a helical division mark 25 between translucent section 32 and opaque section 31. The helical shutter 26 shown in Figure 3 may be formed by taking a rectangle of opaque material, cutting it diagonally, and then forming one of the triangular portions into a partial cylinder. The cyinder 24 may be formed by taking a rectangle of material, as shown in Figure 7, having a translucent part 32 and an opaque part 31 having a diagonal line 25 between said parts, and then rolling the material into a cylinder so that the vertically extending meeting edges form the vertical line 33. Instead of having the part 31 opaque and the part 32 translucent, the said parts may be formed of contrasting translucent sections, such as one part may be of one color and the other part another color. Or the translucent section may be omitted entirely, in which case we have the design shown in Figure 3. In any case, there is a demarcation line 25 forming a helical line, which is the reading line exposed behind the rectilinear window 14. In either case, the said rotatable shutter is secured in a groove 27 at its lower end and to a similar groove in an upper disc 28 within the stationary indicator. The neon tube 10 passes vertically through the approximate center of the upper cap 16 and disc 28, and extends longitudinally through the rotatable shutter.

It will be noted in Figure 2 that the helical shutter is immediately within the stationary indicator 13 and that if the neon tube 10 were illuminated, the observer would see a light only at the extreme bottom of the indicator, for the opaque part 31 of the cylinder 24 would be cutting off all of the other light which would otherwise pass to the upper portions of the rectilinear window 14. This is the position of the parts immediately after the contact 29 moves beneath the stationary contact 30, connected to the lead 1. In other words, when the contacts 29 and 30 are closed, the circuit to the transmitter is closed and the signal is emitted. If the tube 10 is illuminated during the interval of time that the sound travels to the bottom of the ocean and back to the receiver 5, the observer would see a column of light travel upwardly from the zero position to the point where the light was extinguished, which is at the time of the receipt of the echo, and the observer could read this on the scale. If, on the other hand, the light were illuminated only at the instant of the receipt of the echo, he would see a momentary flash of a column of light through the window extending from the bottom of the window to that part of the line 25 which might, at the instant of the receipt of the echo, be behind the rectilinear window 14. In either case the observer would read on the scale of the indicator the total depth at the instant of the receipt of the echo. It will be noted that the area of the window illuminated depends upon the amount of rotation of the shutter between the time the signal was sent out and the time the echo was received, and this area, therefore, is a function of the distance being measured. It is, of course, understood that the calibration on the indicator would be so made as to correctly set forth the function of the elapsed time and the speed per second of the sound through the transmitted medium. In other words, the extreme bottom of the window would be uncovered at the same moment that the transmitter sent out its signal, and if the shutter continues its rotation while the signal travels to the reflecting surface and returns, the shutter would expose more and more of the window. Obviously, under these conditions, if the tube 10 were continuously illuminated during the said interval, and went out at the expiration thereof or at the time the echo was received, the observer would notice a rising column of light, and the position relative to the indicator to which it had risen at the time the echo was received would be a function of the depth of the ocean at that point, and the depth might be directly read on the indicator. If, on the other hand, the tube were illuminated only momentarily at the instant of the receipt of the echo, the observer would notice a momentary flash of a column of light through the window, indicating the depth of the ocean at that moment.

Having now described my invention, I claim:

1. In a meter for measuring and indicating the time elapsing between a controlled first event and a subsequent second event including a uniformly rotatable member of cylindrical form having an opaque surface portion with a helical border, a stationary opaque member adjacent said rotatable member and having an elongated window extending axially of said rotatable member to be successively obscured and exposed by the rotary motion of said opaque surface portion, said helical border exposing portions of said window successively, a light within said rotatable member, means to cause said first event to occur at the instant said rotatable member passes through a zero position and means responsive to said second event to cause said light to illuminate the exposed portion of said window at substantially the instant of the occurrence of said second event.

2. In a meter for measuring and indicating the time elapsing between a controlled first event and a subsequent second event including a uniformly rotatable member of cylindrical form having an opaque surface portion with a helical border, a stationary opaque member adjacent said rotatable member and having an elongated window extending axially of said rotatable member to be successively obscured and exposed by the rotary motion of said opaque surface portion, said helical border exposing portions of said window successively, a light within said rotatable member, means to cause said first event to occur at the instant said rotatable member passes through a zero position and means responsive to said second event to actuate said light.

3. In a meter for measuring and indicating the time elapsing between a controlled first event and a subsequent second event including a uniformly rotatable member of cylindrical form having an opaque surface portion with a helical border, a stationary opaque member adjacent said rotatable member and having an elongated window extending axially of said rotatable member to be successively obscured and exposed by the rotary motion of said opaque surface portion, said helical border exposing portions of said window successively, a light within said rotatable member, means to rotate the rotatable member so as to expose the bottom of the window at the moment of the happening of the first event and to expose successive portions of the window as the rotatable member continues its rotation, and means responsive to said second event to cause said light to illuminate the exposed portion of said window.

TIMOTHY FRANK BLUDWORTH.